United States Patent
Christiansen et al.

(10) Patent No.: US 12,464,969 B2
(45) Date of Patent: Nov. 11, 2025

(54) AGRICULTURAL MACHINE GUIDANCE

(71) Applicant: AGCO International GmbH, Neuhausen (CH)

(72) Inventors: Martin Peter Christiansen, Randers (DK); Esma Mujkic, Randers (DK)

(73) Assignee: AGCO International GmbH, Neuhausen (CH)

( * ) Notice: Subject to any disclaimer, the term of this patent is extended or adjusted under 35 U.S.C. 154(b) by 209 days.

(21) Appl. No.: 18/336,702

(22) Filed: Jun. 16, 2023

(65) Prior Publication Data
US 2023/0403969 A1 Dec. 21, 2023

(30) Foreign Application Priority Data
Jun. 17, 2022 (GB) ...................... 2208929

(51) Int. Cl.
*A01B 79/00* (2006.01)
*A01B 69/04* (2006.01)
*A01D 41/127* (2006.01)

(52) U.S. Cl.
CPC .......... *A01B 79/005* (2013.01); *A01B 69/008* (2013.01); *A01D 41/1278* (2013.01)

(58) Field of Classification Search
None
See application file for complete search history.

(56) References Cited

U.S. PATENT DOCUMENTS

| | | | |
|---|---|---|---|
| 2008/0141639 A1* | 6/2008 | Shields | A01F 12/00 56/14.9 |
| 2017/0049053 A1 | 2/2017 | Bonefas et al. | |
| 2020/0107384 A1* | 4/2020 | Lindner | H04W 4/46 |
| 2022/0019241 A1 | 1/2022 | Christiansen et al. | |
| 2022/0071078 A1* | 3/2022 | Boyer | A01D 90/10 |
| 2022/0105933 A1 | 4/2022 | Shieh | |
| 2022/0312678 A1 | 10/2022 | Faust et al. | |

OTHER PUBLICATIONS

Korthals et al., "Multi-Modal Detection and Mapping of Static and Dynamic Obstacles in Agriculture for Process Evaluation", Frontiers in Robotics and AI, vol. 5, Article 28, pp. 1-23. Mar. 27, 2018 (Year: 2018).*
Kragh et al., "Multi-Modal Obstacle Detection in Unstructured Environments with Conditional Random Fields", J Field Robotics, 2019, pp. 1-20, Mar. 13, 2019 (Year: 2019).*
UK Intellectual Property Office, Search Report for related UK Application No. GB2208929.6, dated Dec. 5, 2022, 3 pages.
European Patent Office, Search Report for related PCT Application No. 23174565.4, dated Oct. 9, 2023, 8 pages.

* cited by examiner

*Primary Examiner* — Tamara L Weber (57) ABSTRACT

Systems and methods are provided for guiding an agricultural machine utilising image data received from one or more imaging sensors associated with the agricultural machine. The image data is analysed utilising a detection model to classify at least one object within the environment of the agricultural machine and the classification is used to identify a cooperative machine for performing a cooperative operational task with the agricultural machine. The systems extend to controlling operation of the guidance system in dependence on the identified cooperative machine.

19 Claims, 5 Drawing Sheets

AGRICULTURAL MACHINE GUIDANCE

CROSS-REFERENCE TO RELATED APPLICATIONS

This application claims priority to United Kingdom patent application number GB 2208929.6, filed Jun. 17, 2022, the entirety of which is hereby incorporated by reference.

FIELD

Embodiments of the present disclosure relate generally to systems and methods for controlling a guidance system for an agricultural machine, and specifically for use with a cooperative machine for performing a cooperative operational task.

BACKGROUND

Many agricultural operational tasks involve the use of multiple agricultural machines operating cooperatively. As an example, a grain cart or trailer may be driven alongside a harvesting machine whilst harvesting to enable simultaneous unloading of the harvested crop material from the harvesting machine to the cart/trailer. This allows the harvesting machine to continue the harvesting task without completely filling its grain bin and thereby requiring a stop in the harvesting task to perform a separate unloading step. This may extend to multiple like machines operating in parallel across a working environment to improve the efficiency (and ultimately the productivity) of a given task.

To further increase the efficiency of such tasks, some systems are beginning to provide the ability to automate certain tasks. This may include automating the steering and/or drive of a machine, for example. When applied to cooperative tasks this may include automating the movement of a "follower" machine with respect to a "leader" machine (or vice versa). In the example given above, movement of the grain cart/trailer may be automated (at least partly) to synchronize its operation with the harvesting machine. Such systems can be rather complex and often require a stable communication link between the leader and follower vehicles, and/or a remote operational sever controlling the operation. As will be appreciated, in an agricultural context in remote and varying conditions this may not always be possible, and hence such known systems may only be useable in certain operating circumstances.

It would be advantageous to provide a system which overcomes or at least partly addresses problems associated with known systems.

BRIEF SUMMARY

In an aspect of the invention there is provided a control system for a guidance system of an agricultural machine, the control system comprising one or more controllers, and being configured to: receive image data from one or more imaging sensors associated with the agricultural machine; analyse the image data utilising a detection model to classify at least one object within the environment of the agricultural machine; identify, from the at least one classified object, a cooperative machine for performing a cooperative operational task with the agricultural machine; and generate and output one or more control signals for controlling operation of the guidance system in dependence on the identified cooperative machine.

Advantageously, the present invention utilises a detection model for identifying from image data a cooperative machine within the environment of the agricultural machine and controls a guidance system of the agricultural machine accordingly, e.g. for performing a cooperative operational task. Such as system may provide an onboard vision system for automating at least part of a cooperative operational task which does not necessarily rely on a data communication between the cooperative machine and the agricultural machine, and as such may be workable in many different operating conditions.

The one or more controllers may collectively comprise an input (e.g. an electronic input) for receiving one or more input signals. The one or more input signals may comprise image data from the one or more imaging sensors. The one or more controllers may collectively comprise one or more processors (e.g. electronic processors) operable to execute computer readable instructions for controlling operational of the control system, for example, to analyse the image data and/or to identify the cooperative machine. The one or more processors may be operable to generate one or more control signals for controlling operation of the guidance system. The one or more controllers may collectively comprise an output (e.g. an electronic output) for outputting the one or more control signals.

The control system may be operable to control the guidance system in dependence on the identity of the identified cooperative machine. The control system may be operable to control the guidance system in dependence on the position of the identified cooperative machine.

The guidance system may comprise a user interface. The control system may be configured to control operation of the user interface for outputting one or more indicators indicative of the identity and/or position of the cooperative machine. This may include highlighting, e.g. to an operator of the agricultural machine, the position of the cooperative machine with respect to the agricultural machine. This may include presenting on a graphical user interface an image, e.g. using image data from the imaging sensor(s) and/or a virtual image, highlighting the position of the cooperative machine.

The control system may be configured to control operation of the user interface of the guidance system for outputting one or more instructions for an operator of the agricultural machine relating to movement of the agricultural machine with respect to the cooperative machine. This may include suggestion of a speed and/or operational path for the agricultural machine for guiding the machine with respect to the cooperative machine, e.g. for performing the cooperative operational task.

The user interface may comprise a display terminal of the machine, for example, a display terminal provided within an operator cab of the agricultural machine, or a remote user device, which may be operable in combination with the agricultural machine.

The control system may be configured to determine an operational path for the agricultural machine for performing the cooperative operational task. The operational path may comprise a direction and/or speed for the agricultural machine.

The control system may be configured to generate and output one or more control signals for controlling operation of the guidance system of the agricultural machine for controlling motion of the agricultural machine along the determined operational path. This may include control over a propulsion system of the agricultural machine for controlling a forward speed of the agricultural machine. The forward speed of the machine may comprise an absolute speed of the machine, or a relative speed with respect to the cooperative machine. The speed of the cooperative machine may be determined utilising sensor data, which may include image data from the imaging sensor(s) for example. This may include utilising sensor data from a LIDAR sensor monitoring a change in distance between the LIDAR sensor (and hence the agricultural machine) and the cooperative machine.

The control system may be configured to control a steering system of the agricultural machine, e.g. for controlling steering of the machine along or with respect to the determined operational path, or with respect to the cooperative machine or one or more components thereof. Here, the movement of the cooperative machine may be determined utilising sensor data, which may include image data from the imaging sensors. This may include monitoring the relative position of the cooperative machine, or one or more components thereof (e.g. an unloading auger) utilising sensor data from a LIDAR sensor providing depth information between the LIDAR sensor (and hence the agricultural machine or an appropriate component thereof—e.g. a trailer) and the cooperative machine (or the appropriate component thereof, e.g. an unloading auger).

The operational path may comprise a suggested or determined path for moving the agricultural machine to an operational position with respect to the cooperative machine. This may include an operational path between the current position of the agricultural machine and a position, e.g. with respect to the cooperative machine, suitable for performing the cooperative operational task.

The operational path may comprise a suggested or determined path for moving the agricultural machine along a path to perform the cooperative operational task.

In some scenarios it may be possible for multiple objects to be present in the environment of the agricultural machine. The control system may be configured to utilise the detection model for determining a classification for one or more of a plurality of objects within the image data. The control system may be configured to determine, from the multiple classifications, one or more candidate cooperative machines. The control system may be configured to select one of the one or more candidate cooperative machines and control the guidance system of the agricultural machine in dependence thereon. This may include selection of the candidate machine which is closest in proximity to the agricultural machine, for example.

The one or more imaging sensors may include a camera. The one or more imaging sensors may comprise a LIDAR sensor. Where used, a LIDAR sensor may be used to obtain information relating to the distance between the object and the sensor, and as such can be used in conjunction with the image data from another sensor, e.g. a camera, for classification by the detection model, for example, for analysing the expected size of a given object within the camera data using the depth information from the LIDAR sensor.

The detection model may comprise a machine-learned model. The machine-learned model may be trained on one or more training datasets with known objects with respective classifications. The machine-learned model may comprise a deep learning model utilising an object detection algorithm. The deep learning model may include a YOLO detection algorithm, such as a YOLOv5 detection model, for example. The training dataset(s) for the model may comprise an agricultural dataset, comprising training images including agricultural-specific objects.

Classification by the detection model may comprise assignment of a class to the object. The class may be one of a plurality of classes for the respective model, as determined during the learning process through assignment of suitable labels to known objects. The plurality of classes may be grouped by category, and optionally by subcategory. For example, the plurality of classes may include 'tractor', 'combine', 'car', 'truck', 'trailer', 'baler', 'combine header', 'square bale', 'round bale', 'person', and 'animal', for example. The classes may be grouped into categories, which may include, for example, 'Vehicle', 'Implement', 'Static Object', and 'Dynamic Object'. The 'Vehicle' category may be further divided into sub-categories, including 'Agricultural'—for example including classes 'tractor' and 'combine'—and 'Road'—including classes 'car', and 'truck', for example. The 'Implement' category may be further divided into sub-categories, including "Tractor'—for example including classes 'trailer' and 'baler'—and 'Combine'—including the 'combine header' class, for example. The 'Static Object' category may include a sub-category 'Bale', for example including classes 'round bale' and 'square bale'. The 'Dynamic Object' category may include a sub-category 'Person', for example including the 'person' class.

The classification output by the detection model may comprise a bounding box overlaid onto the image data at the location of the object as determined by the respective model. The position of the bounding box within the image data may be utilised by the control system for controlling the guidance system. For example, the position of the bounding box within the image data may be used as an indication of the relative position of the identified cooperative machine with respect to the agricultural machine.

In an example, the agricultural machine may comprise a tractor with a trailer and the control system may be configured to identify a cooperative agricultural machine within the environment of the tractor, e.g. a combine harvester performing a harvesting operation. The control system may be configured to control the guidance system in accordance with an operational path which aligns the trailer with an unloading mechanism of the combine for receiving crop material from the combine in the trailer of the tractor-trailer combination. The present invention is advantageously used here for positively identifying the combine, identifying the position of the combine with respect to the tractor/trailer combination, and for controlling the guidance system for aligning the tractor/trailer combination with an unloading mechanism, e.g. an unloading auger, of the combine harvester. As discussed herein, control of the guidance system may include automation of the movement of the tractor to align the trailer with the harvester, or in some instances output of instructions to an operator of the tractor.

In a further example, the agricultural machine may comprise a tractor with an implement suitably coupled thereto. This may be a front mounted implement or a towed implement coupled to a hitch point of the tractor. In such embodiments, the control system may be configured to identify a cooperative agricultural machine within the environment as a tractor with a corresponding implement coupled thereto. This may be an equivalent implement, for example. The control system may be configured to control the guidance system in accordance with an operational path which aligns the tractor and implement combination with the corresponding cooperative machine such that the tractor and implement combination works an adjacent row to the cooperative machine. Working two (or more) adjacent rows in this fashion may reduce the time taken to work the whole working environment. Again, control of the guidance system may include automation of the movement of the tractor to align the tractor and implement combination with the cooperative machine, or in some instances output of instructions to an operator of the tractor for doing so. The implement may, in some instances, comprise a harrow, although the invention is equally applicable to other working implements.

In a further example, the agricultural machine may comprise a baler, which may be self-propelled or may be suitably coupled and towed by a tractor and the control system may be configured to identify a cooperative agricultural machine within the environment of the tractor, e.g. a combine harvester performing a harvesting operation. The control system may be configured to control the guidance system in accordance with an operational path which aligns the intake of the baler with a swath of residue material spread by the combine during the harvesting operation. This may include positioning the baler (or tractor/baler combination) directly behind and spaced from the combine. Again, control of the guidance system may include automation of the movement of the baler (or tractor/baler combination) to align the baler with the harvester, or in some instances output of instructions to an operator of the tractor.

In a further example, the agricultural machine may comprise a harvesting machine, such as a combine harvester or forage harvester. In such embodiments, the control system may be configured to identify a cooperative agricultural machine within the environment as a corresponding harvesting machine. The control system may be configured to control the guidance system in accordance with an operational path which aligns the harvesting machine with the corresponding cooperative harvesting machine such that the harvesting machine works in parallel with the cooperative harvesting machine—e.g. in the next crop row. Working two (or more) adjacent rows in this fashion may reduce the time taken to work the whole working environment. Again, control of the guidance system may include automation of the movement of the harvesting machine with the cooperative harvesting machine, or in some instances output of instructions to an operator of the harvesting machine for doing so.

In further examples, the cooperative task may include machines working in different locations in the environment, for example working from opposite ends of the environment.

In further embodiments the control system may be configured to communicate with a data server associated with the agricultural machine. This may comprise a local server or a remote server, for example, accessible via a wireless data communication channel such as a data network, cellular network or the like. The control system may be operable to store on the data server information indicative of the determined cooperative machine. This may be advantageous, for example, where the present invention is utilised to detect and track the positions of multiple agricultural machines within a working environment. The control system can store this information on the data server which in turn may allow, e.g. a remote operator, to remotely track a farming operation in the working environment utilising multiple vehicles. Using an image based system on a machine with an appropriate data communication capability may allow for tracking of multiple machines and implements within an environment without such systems, or without onboard positioning systems such as a GNSS system, and possibly without a direct connection between the cooperative machine and the agricultural machine.

A further aspect of the invention comprises a guidance system for an agricultural machine, comprising one or more imaging sensors; wherein the system further comprises and/or is controllable by the control system of any preceding aspect.

Another aspect of the invention provides an agricultural machine comprising a control system and/or a guidance system as described herein.

The agricultural machine may comprise a harvesting machine, such as a combine harvester or forage harvester, for example. The agricultural machine may comprise a tractor.

A further aspect of the invention provides a method for guiding an agricultural machine, comprising: receiving image data from one or more imaging sensors associated with the agricultural machine; analysing the image data utilising a detection model to classify at least one object within the environment of the agricultural machine; identifying, from the at least one classified object, a cooperative machine for performing a cooperative operational task with the agricultural machine; and controlling operation of the guidance system in dependence on the identified cooperative machine.

The method of the present aspect of the invention may comprise performance of any one or more of the functional features of the control system of a preceding aspect discussed herein.

A further aspect of the invention comprises computer software which, when executed by one or more processors, causes performance of the method of the preceding aspect of the invention.

An aspect of the invention provides a computer readable storage medium comprising the computer software of the preceding aspect of the invention.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

One or more embodiments of the invention/disclosure will now be described, by way of example only, with reference to the accompanying drawings, in which.

DETAILED DESCRIPTION

Figure 1:
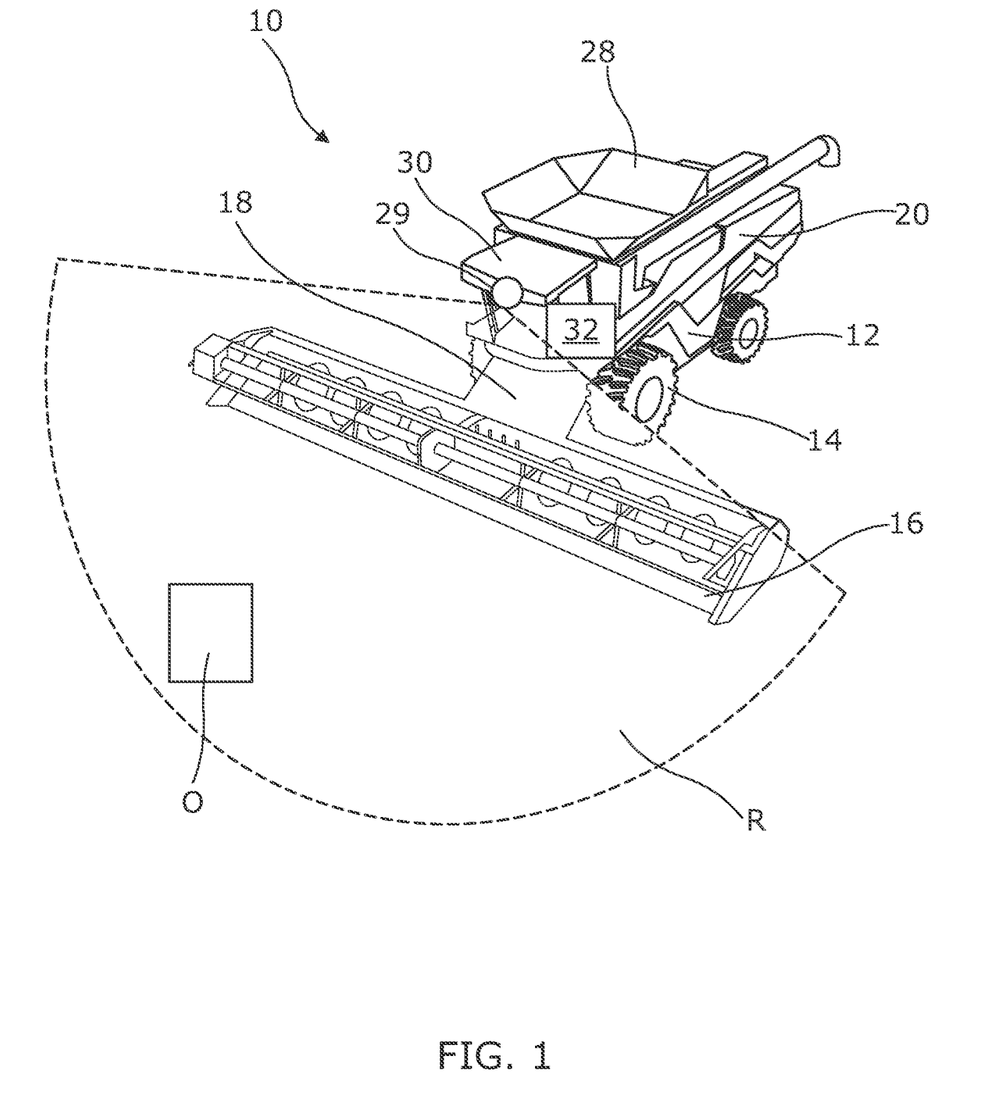
FIG. 1 is a simplified perspective view illustrating an embodiment of an agricultural machine according to the present disclosure.
Figure 2:
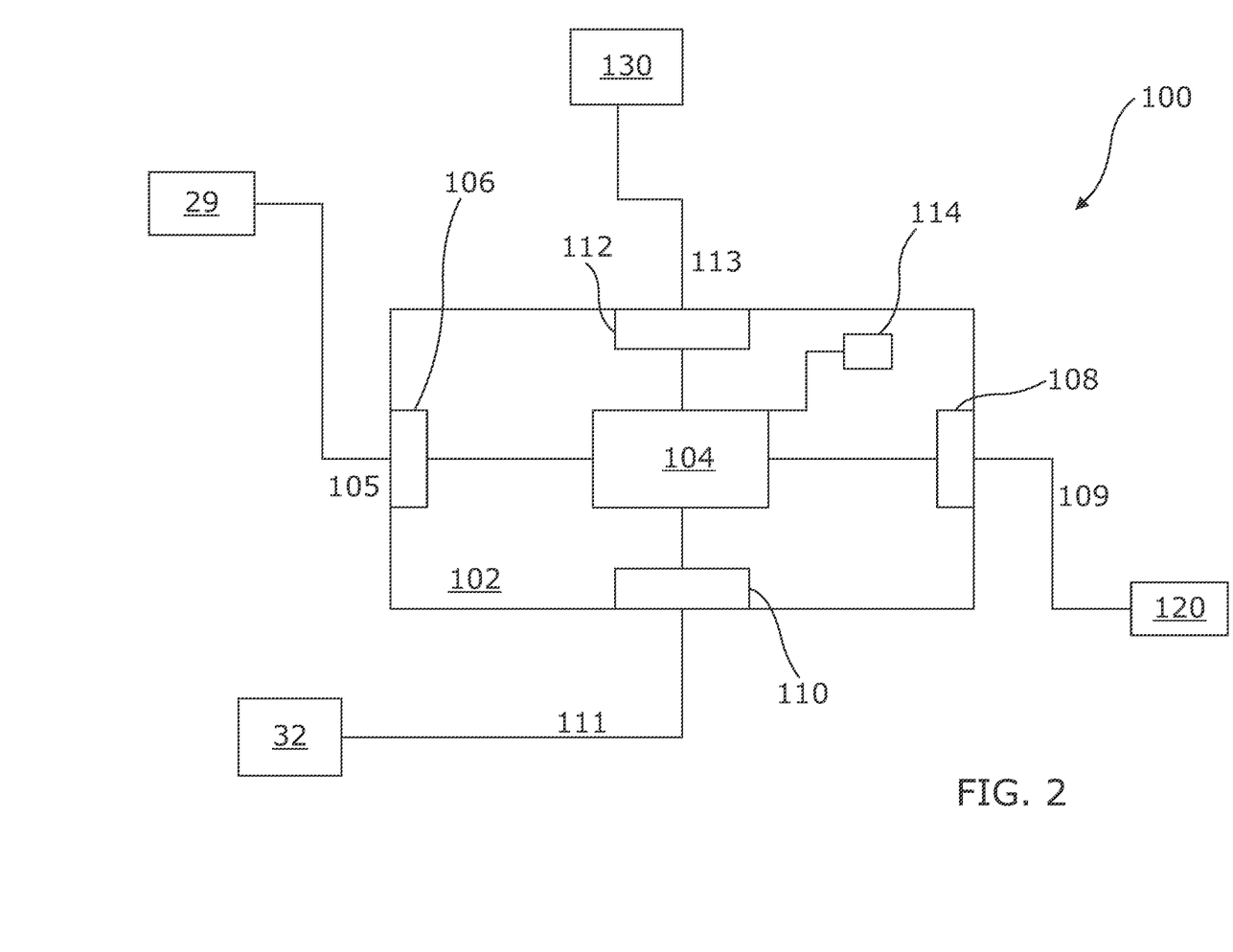
FIG. 2 is a schematic diagram illustrating an embodiment of a control system of the present disclosure.

Systems and methods are provided for guiding an agricultural machine, (e.g. a harvester 10). Image data from one or more imaging sensors (e.g. cameras 29, LIDAR units, etc.) mounted, coupled or otherwise associated with the harvester 10 is obtained and used to detect objects (e.g. object 'O') within the environment of the harvester 10. Specifically, the image data is analysed using an object detection model to classify at least one object within the environment of the harvester 10. Following classification, a cooperative machine is identified for the harvester 10, being a machine capable for performing an appropriate cooperative operational task with the harvester 10. As discussed herein, a cooperative machine for a harvester 10 may include a further harvester operating within the environment such that harvester 10 and the further harvester may work adjacent rows of the field. Operation of a guidance system of the harvester 10 can then be controlled in dependence on a positive identification of a cooperative agricultural machine. As discussed herein, this may include controlling motion of the harvester 10, e.g. through control over a propulsion, braking and/or steering system of the harvester 10 for controlling motion of the harvester 10 along an appropriate operational path for the cooperative operational task. The invention may extend to controlling further operable components associated with the harvester 10, and may include a user interface, e.g. display terminal 32 provided within an operator cab 30 of the harvester 10 for displaying information indicative of the identified cooperative machine, a determined operational path or the like to an operator of the harvester 10, e.g. for providing guidance instructions to the operator.

Harvester

FIG. 1 illustrates an agricultural harvester 10, which includes a chassis 12 supported and propelled along the ground by ground-engaging wheels 14. Although the harvester 10 is illustrated as being supported and propelled on ground-engaging wheels 14, the harvester 10 can also be supported and propelled by full tracks or half tracks, as will be appreciated. A harvesting header 16 carried by the chassis 12 is used to gather crop and to conduct the crop material to a feederhouse 18 and then to a beater in the harvester 10. The beater guides the crop upward to a threshing and separating system 20, which is configured to separate grain from material other than grain (MOG), and deliver the grain to a grain tank 28 carried by the harvester 10. The operation of the harvester 10 is controlled from an operator cab 30. A user interface 32 is provided within the operator cab 30 for displaying or otherwise providing information to an operator of the harvester 10 data indicative of the operation of the harvester 10 or other associated components, e.g. the header 16 or the guidance system as discussed herein.

The harvester 10 is additionally provided with an imaging sensor in the form of camera 29 mounted thereto and configured to obtain image data representative of the working environment of the harvester 10, and analysed in the manner discussed herein. In an extension of the present disclosure, the harvester 10 (or more generally the agricultural machine) may additionally or alternatively be provided with a different type of imaging sensor. For example, a transceiver-type sensor, such as a LIDAR sensor may be provided for imaging the environment of the machine. Advantageously, transceiver-type sensors may provide depth information for the environment, including a measure of a distance between the machine and the object. This can be utilised by the present disclosure, and in particular by the detection model for classifying one or more objects within the environment of the machine.

Whilst discussed herein with reference to harvester 10, it will be apparent to the skilled reader that the systems and methods discussed herein may be applicable to any agricultural machine, including forage harvesters, self-propelled balers, tractors and tractor/implement combinations, including others.

Control System

As discussed herein, a control system 100 is provided and configured to control operation of one or more operable components (e.g. a guidance system 120, data server 130, and/or user interface 32) associated with the harvester 10. In the illustrated embodiment the controllable components include a guidance system 120 of the harvester for controlling operational parameters of the harvester 10, e.g. a forward speed or path, a data server 130 for storing information representative of the classification outputs of the detection model, the determined identity of cooperative operational machines in the environment, and/or a determined operational path as determined in dependence on the cooperative machine identification as discussed herein; and the user interface 32, here provided as a display terminal 32 provided within the operator cab 30 of the harvester 10 as discussed, and utilised to provide an indication of the operation of the control system 100, e.g. a determined identity for a cooperative operational machine within the working environment of the harvester 10 and/or a determined operational path for the harvester 10 for performance of the cooperative operational task.

FIG. 2 illustrates the control system 100 further. As shown, control system 100 comprises a controller 102 having an electronic processor 104, electronic input 106 electronic outputs 108, 112 and electronic input/output 110. The processor 104 is operable to access a memory 114 of the controller 102 and execute instructions stored therein to perform the steps and functionality of the present disclosure discussed herein, e.g. by controlling operation of operable components associated with the harvester 10 in dependence on a determined identity for one or more objects in the environment of the harvester 10, as determined by the control system 100, optionally including controlling the user interface 32 to display information indicative of determined identities and/or to receive an operator input for initiating control actions based on the determined identities, through generation and output of one or more control signals.

The processor 104 is operable to receive via input 106 which, in the illustrated embodiment, takes the form of input signals 105 received from a control unit associated with camera 29 associated with the harvester 10, image data representative of the working environment of the harvester 10. The processor 104 is configured to analyse the image data and determine therefrom a classification for one or more objects in the environment in the manner discussed herein, i.e. using a trained object detection models for identifying the objects. The processor 104 is further configured to utilise the determined classification to identify a cooperative operational machine within the environment of the harvester 10.

As described above, the controller 102 includes an electronic output 108 configured to output control signals 109 generated by the processor 104 for controlling operation the guidance system 120 of the harvester 10. Specifically, in the illustrated embodiment, the processor 104 is operable to generate, and the controller 102 operable then to output via output 108, control signals 109 to local control unit of the guidance system 120 for controlling motion of the harvester 10 in dependence on the identity of the cooperative machine as determined in the manner described herein. In practice, this may include control over a forward speed and/or operational path for the harvester 10 for performance of the cooperative task. The guidance system 120 may be controlled to control operation of one or more of a steering system, braking system and/or propulsion system of the harvester 10, for example, for controlling motion of the harvester 10 in the manner described herein.

Input/output 110 is operably connected to user interface 32. The control system 100 is operable to control operation of the user interface 32, e.g. through output of control signals 111 in order to display data to an operator of the harvester 10 indicative of the identity of a cooperative machine, as determined by processor 104. This can include simply providing an indication to the operator of the determined identity(ies). This may include providing a graphical representation, optionally including image data from the camera 29, of the working environment, object(s) located therein and any identities determined for those objects as per the present disclosure. This may include presenting a representation of an operational path for the harvester 10 for performance of the cooperative task. The input/output 110 is additionally configured to receive input signals 111 from the user interface 32 indicative of an operator input at the user interface 32, for example to provide the operator an ability to interact with the data.

Output 112 is operably connected to a data server, preferably a remote data server 130 for storing information indicative of the determined identities and/or determined operation of the guidance system. This may be used, for example, by a remote user monitoring operation of multiple machines within the working environment. Here, the image data from the camera 29 can therefore be used to provide tracking data for multiple machines to a remote server 130.

Method

Figure 3:
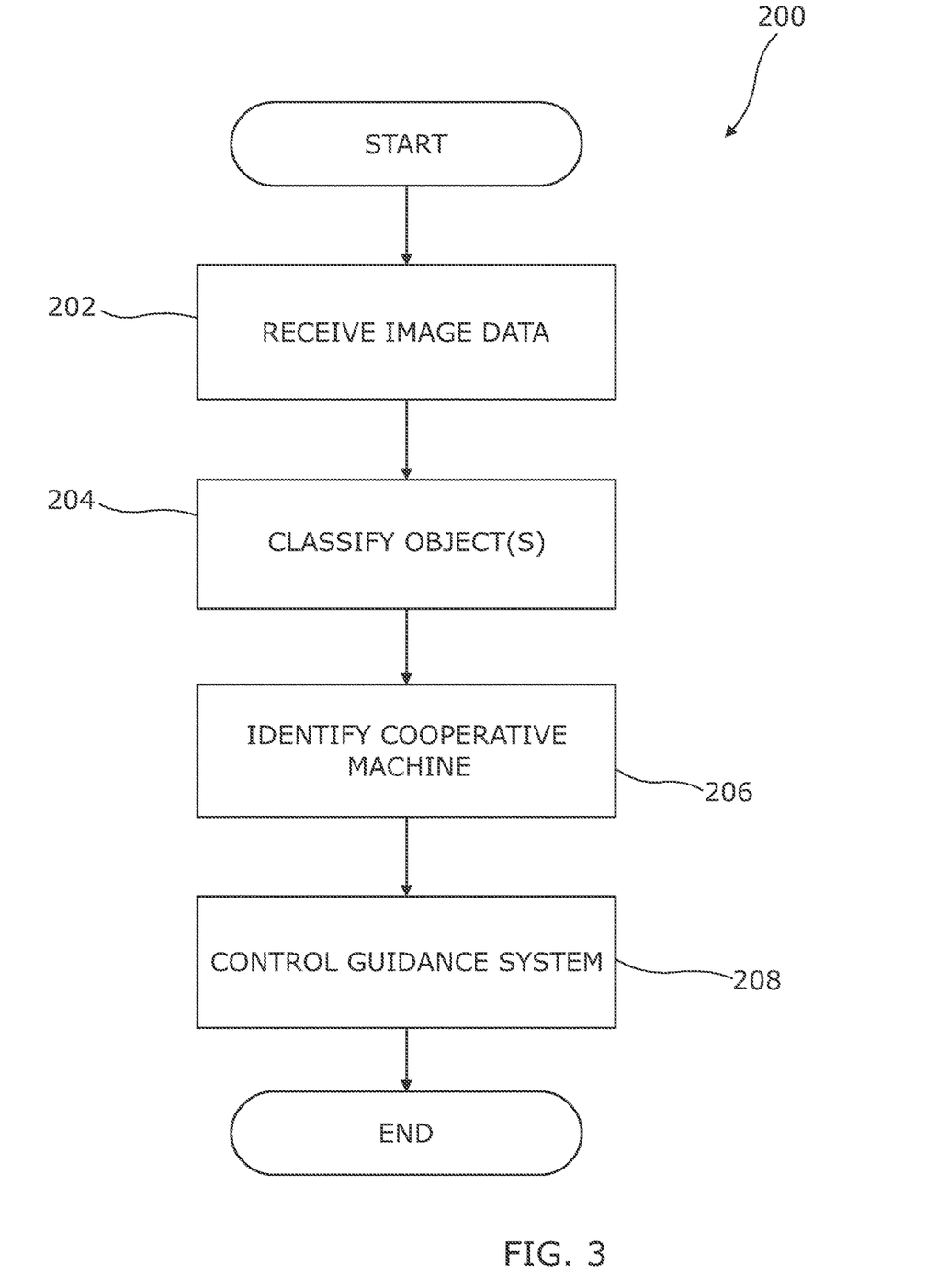
FIG. 3 is a flowchart illustrating an embodiment of a method of the present disclosure.

FIG. 3 illustrates a method 200 in accordance with the present disclosure. Method 200 comprises, at step 202, receiving image data from one or more image sensors (here camera 29) mounted to the harvester 10 and operable, in use, to capture image data representative of the working environment of the harvester 10. As shown herein, the camera 29 is mounted on the operator cab 30 of the harvester 10 and is directed such that the field of view R of the camera 29 encompasses a region ahead of the harvester 10, in use. It will be appreciated that the invention is not limited in this sense, and the camera 29 or indeed any imaging sensor employed may be mounted with a field of view about any direction of the working machine.

At step 204, the image data received, here from camera 29, is analysed utilising the object detection model to classify one or more objects within the environment of the harvester 10. The object detection models comprises a trained object detection algorithm, trained using one or more training datasets having a plurality of images and known objects in those images. The training dataset used for training of the detection model may include multiple images annotated for multiple agriculture-specific classes. The annotated classes can include, for example: individual agriculture machines and/or implements, including 'tractor', 'combine', 'trailer', 'combine header', 'baler', or other in-field objects, including 'square bale', 'round bale', 'hedgerow', etc.

In an embodiment, the object detection model is based on YOLOv5 trained on this dataset. As would be understood, a YOLOv5 model is a single-stage object detector and consist of a backbone network, neck and detection head. The cross stage partial connections (CSP) backbone network is used to extract features from the input image. The layers in the neck of the network are inserted to collect feature maps from different stages. This enables the model to perform better when detecting objects of various sizes and scales. In YOLOv5, PANet is used as the neck network to obtain feature pyramids. The YOLO head applies anchor boxes on features and generates final output vectors with class probabilities, objectness scores and bounding boxes. The present disclosure utilises these output vectors to determine an identity for a given object, and specifically to identify one or more cooperative machines in the environment of the harvester 10.

At step 206, a cooperative agricultural machine is identified. Specifically, the classification(s) output by the object detection model are analysed to determine which of one or more objects identified within the environment of the harvester 10 may represent a cooperative agricultural machine for performing a cooperative operational task. For harvester 10, and as discussed herein, this may include one or more further harvesting machines in the environment for working a plurality of adjacent crop rows.

At step 208, the guidance system of the harvester 10 is then controlled based on an identification of a cooperative agricultural machine. In an example, a forward speed for the harvester 10 may be adjusted e.g. increased or reduced, in dependence on an identification of cooperative machine to bring the harvester 10 into a cooperative working position with respect to the cooperative machine. As will be understood, this could include bringing the harvester 10 alongside the cooperative machine, or to follow the cooperative machine, e.g. by matching the forward speed of the harvester 10 with the forward speed of the identified cooperative machine. In practice, adjusting a forward speed of the harvester 10 includes control over a braking and/or propulsion system of the harvester 10, e.g. via the guidance system 120. This may extend to controlling a steering system of the harvester 10, e.g. for controlling the harvester 10 to operate along an operational path for performance of the cooperative operational task, which may include bringing the harvester 10 into alignment with the other machine initially and/or retaining a cooperative alignment of the two (or more) machines during performance of the cooperative task.

Additionally or alternatively, step 208 may include output of information relating to the determined identity(ies) to the remote data server 130, serving as a tracking system for tracking the position of objects, including other agricultural machines, within the working environment.

Further, operable component(s) can, in embodiments, include control over the user interface 32 in the manner discussed herein. For example, controlling the user interface 32 to display or otherwise present to the operator an indication of determined identity(ies), and/or a representation of image data obtained by the camera 29 or other applicable imaging sensors. User interface 32 may be used to output guidance instructions to an operator of the harvester 10 for performance of the cooperative task with the identified cooperative machine.

EXAMPLES

Figure 4:
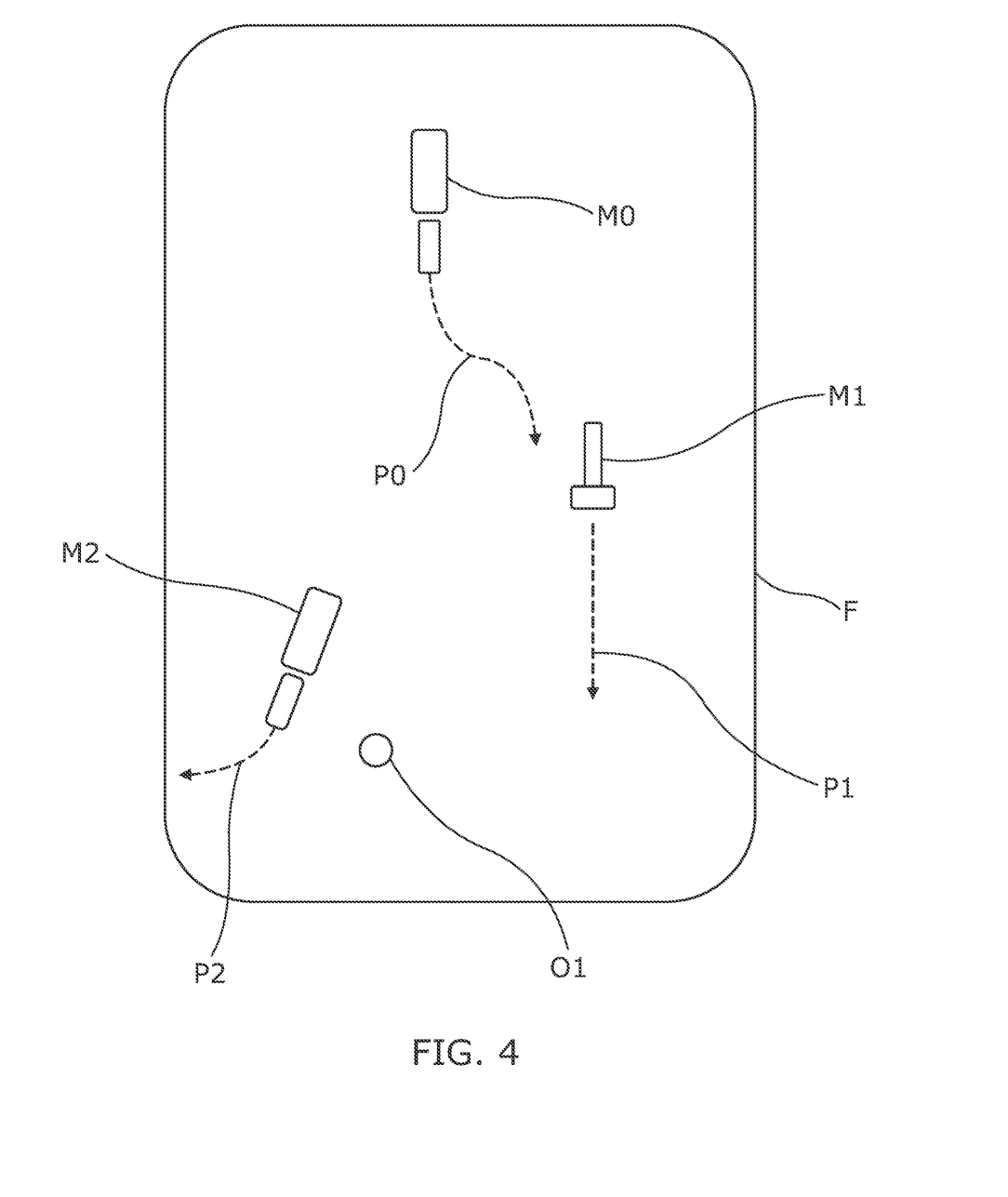
FIG. 4 is a schematic representation of a working environment demonstrating the operational use of embodiments of the present disclosure.

FIG. 4 shows an example working environment F illustrating the operational use of embodiments of the present disclosure discussed herein. Here, the present invention provides control of a guidance system of an agricultural machine in the form of tractor M0 and trailer combination. Here, one or more imaging sensors are provided mounted on the tractor M0 and having an imaging region forward of the tractor M0 for imaging the working environment. As discussed herein, the one or more imaging sensors can include one or a combination of a camera, a transceiver sensor such as a LIDAR unit, amongst others.

In the illustrated example, the one or more imaging sensor associated with tractor M0 are used to obtain image data of the working environment. Utilising the object detection model, classifications for various objects identified in the working environment can be determined. In this example, this includes a further tractor/trailer combination M2 following a working path P2, an obstacle in the form of an electricity pole O1 fixed in position within the field F and a harvesting machine M1 following a working path P1.

The classified objects are then analysed to identify a cooperative machine for performing a cooperative operational task with the tractor/trailer combination M0. In this instance, this includes harvesting machine M1, and the cooperative task comprises an unloading operation for unloading crop material from a grain tank of the harvesting machine M1 to the trailer of the tractor/trailer combination M0.

For performance of the cooperative task, an operational path P0 is determined for the tractor/trailer combination M0 for bringing the tractor/trailer combination M0 into cooperative alignment with the harvesting machine. Specifically, this is a position where the trailer is aligned with an unloading mechanism of the harvesting machine M1 for receiving crop material therefrom. A guidance system of the tractor M0 is then controlled for controlling movement of the tractor/trailer combination M0 along with determined operational path for performance of the cooperative task, e.g. through suitable control of a propulsion, braking and/or steering system of the tractor for guiding the tractor/trailer combination M0 along the path.

Aspects of the present disclosure are advantageously configured to distinguish between multiple objects within the working environment for identification of a cooperative machine, and to control the guidance system accordingly for performance of a cooperative task with that identified machine.

In a variant, the agricultural machine may instead be a tractor with a working implement suitably coupled thereto, e.g. at a rear hitch. Here, a suitable cooperative agricultural machine may include a further tractor with a corresponding implement coupled thereto. An operational path for the tractor may be one which aligns the tractor and implement combination with the corresponding cooperative machine such that the tractor and implement combination works an adjacent row to the cooperative machine. The implement may, in some instances, comprise a harrow, although the invention is equally applicable to other working implements.

In a further variant, the agricultural machine may be a baler, e.g. a self-baler or a baler unit suitably coupled and towed by a tractor. A cooperative machine may include a combine harvester performing a harvesting operation, and a suitable operational path may be one which aligns the intake of the baler with a swath of residue material spread by the combine during the harvesting operation, e.g. by positioning the baler (or tractor/baler combination) directly behind and spaced from the combine harvester.

In a further variant, the agricultural machine may comprise a harvesting machine, such as combine harvester 10. A cooperative agricultural machine may be a corresponding harvesting machine, and a suitable operational path may be one which aligns the harvester 10 with the corresponding cooperative harvesting machine such that the harvester 10 works in parallel with the cooperative harvesting machine—e.g. in the next crop row.

Other variants may be equally applicable, and the present disclosure is not limited in this sense.

Figure 5A:
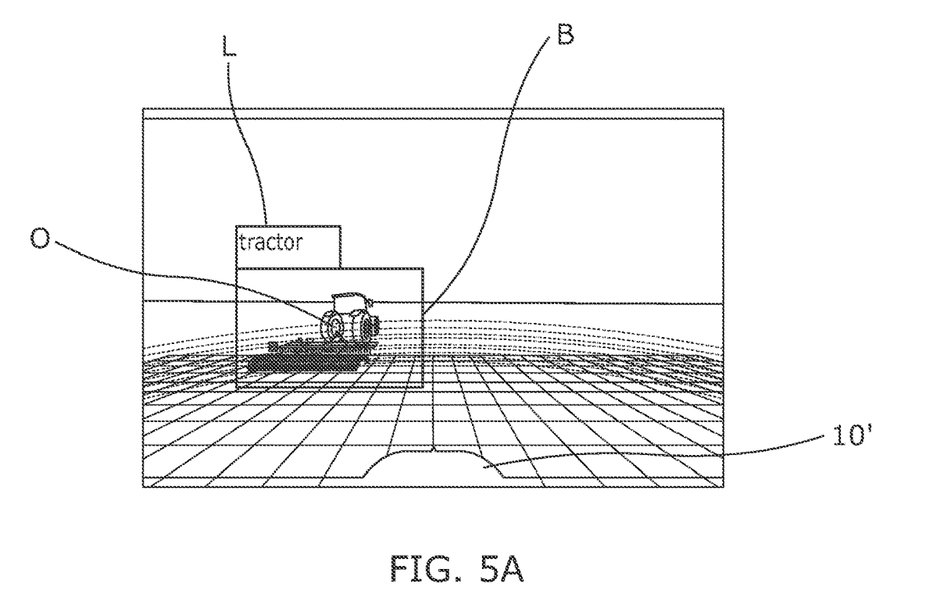
FIGS. 5A & 5B illustrate the operational use of aspects of the present disclosure.
Figure 5B:
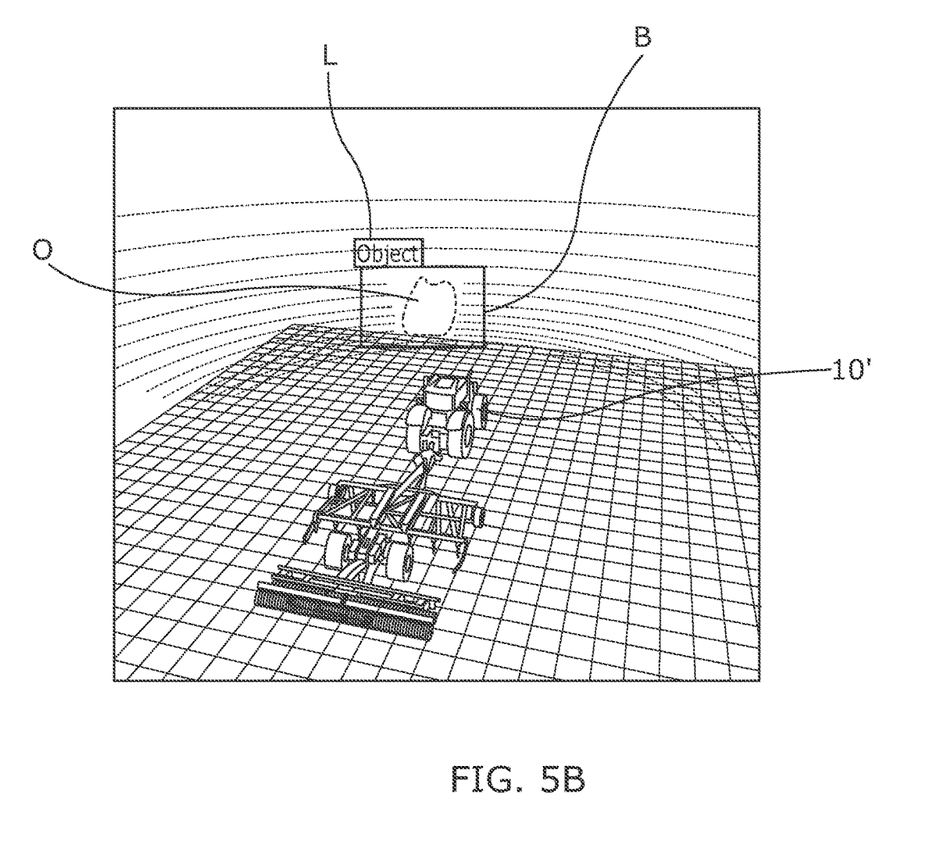

As discussed, the present disclosure extends to control over a user interface, e.g. a display terminal 32 provided within an operator cab 30 of the harvester 10 (or like components of other agricultural machines. FIGS. 5A and 5B illustrate example representations that may be provided by a suitable user interface (e.g. display terminal 32) upon successful identification of a cooperative machine (or indeed classification of other objects within the environment). For example, FIG. 5A represents a representation of image data obtained by a camera 29' provided on an agricultural machine in the form of a tractor 10'. Here an object 'O' has been identified in the manner discussed herein, and an appropriate bounding box B and label L has been provided to highlight the position and identity of the object—here another tractor—to an operator of the tractor 10'. This may be provided for purely informational purposes to the operator of the tractor 10', or could provide means for the operator to interact with the interface—e.g. to select a cooperative machine on the interface, or to provide further instructions to the system—e.g. initiating performance a cooperative task. FIG. 5B shows a representation of image data obtained by a LIDAR unit also provided on the tractor 10'. Again, the object 'O' is identified and highlighted in the image data from the sensor—LIDAR unit. The LIDAR unit may be used to provide depth information which is used in conjunction with the image data from camera 29' for identifying the object O. Depth information may also be utilised, as will be appreciated, for control over the relative distances between the agricultural machine and a cooperative machine, e.g. whilst performing the cooperative operational task.

General

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as set out herein and a machine readable storage storing such a program. Still further, embodiments of the present invention may be conveyed electronically via any medium such as a communication signal carried over a wired or wireless connection and embodiments suitably encompass the same.

All references cited herein are incorporated herein in their entireties. If there is a conflict between definitions herein and in an incorporated reference, the definition herein shall control.

What is claimed is:

1. A control system for a guidance system of an agricultural machine, the control system comprising one or more controllers, and being configured to:
receive image data from one or more imaging sensors associated with the agricultural machine;
analyze the image data utilizing a detection model to classify at least one object within the environment of the agricultural machine;
identify, from the at least one classified object, a cooperative machine for performing a cooperative operational task with the agricultural machine;
generate and output one or more control signals for controlling operation of the guidance system in dependence on the identified cooperative machine; and
maneuver the agricultural machine on an operational path to perform at least a portion of the cooperative operation task while both the cooperative machine and the agricultural machine are in motion.

2. The control system as claimed in claim 1, wherein the control system is further configured to control the guidance system in dependence on at least one of an identity and a position of the identified cooperative machine.

3. The control system of claim 1, wherein the guidance system comprises a user interface; and the control system is configured to control operation of the user interface for outputting one or more indicators indicative of at least one of an identity and a position of the cooperative machine.

4. The control system of claim 3, wherein the control system is further configured to control operation of the user interface of the guidance system for outputting one or more instructions for an operator of the agricultural machine relating to movement of the agricultural machine with respect to the cooperative machine.

5. The control system of claim 1, wherein the control system is further configured to determine the operational path for the agricultural machine for performing the cooperative operational task.

6. The control system of claim 5, wherein maneuvering the agricultural machine on the operational path to perform at least a portion of the cooperative operation task comprises controlling operation of the guidance system of the agricultural machine for controlling motion of the agricultural machine along the operational path.

7. The control system of claim 6, wherein the control system is further configured to control:
a propulsion system of the agricultural machine for controlling a forward speed of the agricultural machine; and
a steering system of the agricultural machine for controlling steering of the machine along or with respect to the operational path or with respect to the cooperative machine or one or more components thereof.

8. The control system of claim 5, wherein:
the operational path comprises a suggested or determined path for moving the agricultural machine to an operational position with respect to the cooperative machine; and
the operational path comprises a suggested or determined path for moving the agricultural machine along a path to perform the cooperative operational task.

9. The control system of claim 1, wherein the control system is further configured to utilize the detection model for determining a classification for each of a plurality of objects within the image data.

10. The control system of claim 9, wherein the control system is further configured to:
determine, from the multiple classifications, one or more candidate cooperative machines;
select one of the one or more candidate cooperative machines; and
control the guidance system of the agricultural machine in dependence thereon.

11. The control system of claim 1, wherein the detection model comprises a machine-learned model trained on one or more training datasets with known objects with respective classifications.

12. The control system of claim 1, wherein the classification output by the detection model comprises a bounding box overlaid onto the image data at the location of the object as determined by the respective model; and wherein the position of the bounding box within the image data is utilized by the control system for controlling the guidance system.

13. The control system of claim 1, wherein the agricultural machine comprises a tractor with a trailer suitably coupled thereto; and the control system is configured to:
identify the cooperative agricultural machine within the environment of the tractor as a combine harvester performing a harvesting operation; and
control the guidance system in accordance with an operational path which aligns the trailer with an unloading mechanism of the combine for receiving crop material from the combine in the trailer of the tractor-trailer combination.

14. The control system of claim 1, wherein the agricultural machine comprises a tractor with an implement suitably coupled thereto; and the control system is configured to:
identify the cooperative agricultural machine within the environment as a tractor with a corresponding implement coupled thereto; and
control the guidance system in accordance with an operational path which aligns the tractor and implement combination with the corresponding cooperative machine such that the tractor and implement combination works an adjacent row to the cooperative machine.

15. The control system of claim 1, wherein the agricultural machine comprises a baler; and the control system is configured to:
identify the cooperative agricultural machine within the environment of the tractor as a combine harvester performing a harvesting operation; and
control the guidance system in accordance with an operational path which aligns the intake of the baler with a swath of residue material spread by the combine during the harvesting operation.

16. The control system of claim 1, wherein the agricultural machine comprises a harvesting machine; and the control system is configured to:
identify the cooperative agricultural machine within the environment as a corresponding harvesting machine; and
control the guidance system in accordance with an operational path which aligns the harvesting machine with the corresponding cooperative harvesting machine such that the harvesting machine works in parallel with the cooperative harvesting machine.

17. A guidance system for an agricultural machine, comprising one or more imaging sensors; and wherein the system further comprises the control system of claim 1.

18. An agricultural machine comprising a control system for a guidance system of the agricultural machine, the control system comprising one or more controllers, and being configured to:
  receive image data from one or more imaging sensors associated with the agricultural machine;
  analyze the image data utilizing a detection model to classify at least one object within the environment of the agricultural machine;
  identify, from the at least one classified object, a cooperative machine for performing a cooperative operational task with the agricultural machine;
  generate and output one or more control signals for controlling operation of the guidance system in dependence on the identified cooperative machine; and
  maneuver the agricultural machine on an operational path to perform at least a portion of the cooperative operation task while both the cooperative machine and the agricultural machine are in motion.

19. A method for guiding an agricultural machine, comprising:
  receiving image data from one or more imaging sensors associated with the agricultural machine;
  analyzing the image data utilizing a detection model to classify at least one object within the environment of the agricultural machine;
  identifying, from the at least one classified object, a cooperative machine for performing a cooperative operational task with the agricultural machine;
  controlling operation of a guidance system of the agricultural machine in dependence on the identified cooperative machine; and
  maneuver the agricultural machine on an operational path to perform at least a portion of the cooperative operation task while both the identified cooperative machine and the agricultural machine are in motion.

* * * * *